3,294,869
CROSS-LINKING OF ATACTIC POLYPROPYLENE
AND ATACTIC COPOLYMERS OF PROPYLENE
Anderson E. Robinson, Newark, Del., assignor to Hercules Incorporated, a corporation of Delaware
No Drawing. Filed Dec. 26, 1957, Ser. No. 705,104
7 Claims. (Cl. 260—878)

This invention relates to improvements in the free-radical catalyzed cross-linking of polymers and copolymers of ethylene and propylene and mixtures thereof.

Polyethylene undergoes curing by cross-linking agents of the free-radical type to give a polymer of increased tensile strength and modulus. In the case of polypropylene, however, degradation predominates over cross-linking under the usual cross-linking conditions so that a soft product is obtained from a normally solid rubbery polypropylene.

In accordance with the present invention, it has now been found that certain organic materials, when added to these polymers, modify the free-radical catalyzed polymerization reaction to such an extent that the polymers are cross-linked with less free-radical catalyst than is otherwise required, and even rubbery polypropylene, like polyethylene, is also cross-linked to a solid polymer of increased tensile strength and modulus. The organic materials which act as modifiers in accordance with this invention are: polyallyl esters of cyanuric acid, diallyl esters of aromatic and aliphatic dibasic acids, polyallyl ethers of polyhydric alcohols, symmetrical divinyl hydrocarbons, in which the vinyl groups are separated from each other by at least 3 carbon atoms, diallyl, allyl methacrylate, dinitroso compounds, and diphenyl guanidine. Examples of diallyl esters of aromatic and aliphatic dibasic acids are diallyl phthalate, diallyl oxalate, diallyl maleate, diallyl malate, diallyl malonate, diallyl citrate, diallyl glutarate, diallyl succinate, and diallyl adipate. Examples of polyallyl ethers of polyhydric alcohols are diallyl ether of ethylene glycol, triallyl ether of glycerol, diallyl ether of glycerol, diallyl ether of diethylene glycol, diallyl ether of pentaerythritol, diallyl ether of glycerol monomethyl ether, diallyl ether of pentaerythritol diacetate, triallyl ether of pentaerythritol, triallyl ether of pentaerythritol acetate.

Examples of the symmetrical divinyl hydrocarbons are: m- and p-divinyl benzenes, toluenes and naphthalenes; alpha,omega - divinyl-n-butane, alpha,omega-divinyl-n-pentane, and alpha,omega-divinyl-n-hexane; m- and p-divinyl cyclohexanes, divinyl tetrahydronaphthalenes, and divinyl hexahydronaphthalenes. Examples of dinitroso compounds are dinitrosopiperazine, m- and p-dinitrosobenzene, and N-nitroso-N-methylamino-p-nitrosobenzene, dinitrosodiphenyl guanidine, and dinitrosodiphenylurea.

The modifiers of the present invention are believed to enter into the cross-linking reaction by virtue of their greater reactivity with free-radicals in the chain reaction in which they act both as chain transfer agents and ultimately as cross-link bridges between polymer molecules. In acting as chain transfer agents, these modifiers prevent termination of the chain reaction and thus reduce the concentration of free-radical required for curing of polyethylene, polypropylene and copolymers thereof.

The amount of these modifiers that is required is not critical and may vary over a wide range. However, a sufficient minimum amount should be used so that their effectiveness is observable in improved properties and the amount is preferably a minor proportion of the composition. Thus, an amount from about 0.5 to about 20% of the composition can be used, but for practical purposes, about 1 to about 10% is preferred. These modifiers are not in themselves free-radical generators but act merely as intermediates for extending the life of the free-radicals produced by free-radical generators. As free-radical generators there may be used organic or inorganic compounds which break down under the influence of heat, friction, irradiation with ultraviolet, X-rays, or rays emanating from radioactive materials. Free-radicals may also be produced directly from the materials to be coupled by the action of oxidizing agents, ultraviolet, X-rays, or gamma radiation emanating from radioactive sources.

The free-radical generators of an organic or inorganic nature which may be used include peroxides, hydroperoxides, peracids, metal alkyls, metal aryls, and combinations with inorganic complex formers. Specific free-radical generators include materials heretofore known as polymerization catalysts for polymerization of olefins and olefinic compounds. Organic free-radical generators include the following symmetrical or bis(aralkyl) and bis(alkyl) peroxides: dibenzyl peroxide, bis($\alpha$-methylbenzyl) peroxide, bis($\alpha,\alpha$-dimethylnaphthylmethyl) peroxide, bis($\alpha,\alpha$-dimethyl-p-methylbenzyl) peroxide, bis ($\alpha,\alpha$-dimethyl-p-isopropylbenzyl) peroxide, and di-t-butyl peroxide.

Unsymmetrical peroxides useful in the invention include the following compounds: benzyl ($\alpha$-methylbenzyl) peroxide, benzyl ($\alpha$-methyl-p-methylbenzyl) peroxide, benzyl ($\alpha$-methyl-p-isopropylbenzyl) peroxide, and t-butyl ($\alpha,\alpha$-dimethylbenzyl) peroxide.

Other well known organic catalysts useful in this invention include benzoyl peroxide, acetyl peroxide, lauroyl peroxide, t-butyl perbenzoate, and ascaridole. Moreover, peroxides of the polymer such as are produced by oxidation with air, hydrogen peroxide, sodium persulfate, or alkali or alkaline earth peroxides on heating form initiating free-radicals in the process of this invention. Other free-radical formers are the azo compounds such as $\alpha,\alpha$-azobis-(isobutyronitrile).

The cross-linking temperature depends on the source of free-radicals since elevated temperatures are not required for cross-linking and are used only when required for the creation of free-radicals from the free-radical generator, or when the polymer is subjected to molding conditions during the cross-linking process. When heat is used to develop free-radicals from diaralkyl peroxides a temperature in the range of 270–400° F. is preferred. When means other than heat is used to develop the free-radicals in the system, temperatures as low as about —10° F. may be used. The temperature during cross-linking may thus be anywhere in the range of about —10° F. to about 400° F. and the temperature is selected according to the need with respect to free-radical generation, molding or the like.

The following examples illustrate the manner of making and using the modifiers of this invention in the preparation and cross-linking of hydrocarbon polymers in accordance with this invention. Parts are expressed as parts by weight. "Reduced specific viscosity" (RSV) which is a function of molecular weight is applied herein to specific viscosity measured at 135° C. on a decahydronaphthalene solution of the polymer (0.1 gram per 100 ml. of solution), corrected to zero shear gradient, divided by the concentration of the solution as expressed.

*Examples*

Polymer compositions were made up by mixing on a two-roll mill 100 parts the indicated polymer, 5 parts dicumyl peroxide, and 5 parts of the indicated modifier. The temperature was in the range of 130° F. (170°–200° F. for copolymer) during milling. The stocks were then cross-linked by heating at 320±20° F. for 30 minutes. The extent of cross-linking was determined by analysis for percent gain in insolubility in solvents in which uncross-linked polymer is soluble. This is termed percent gel hereinafter. Data are tabulated in comparison with a blank formulation in which the modifier was omitted.

The percent gel and percent swell are determined as follows: a weighed cylindrical sample of polymer weighing about 100 mg. is soaked in an excess of toluene (30 cc.) in a closed container for 48 hours. The sample is then removed, blotted on filter paper without squeezing so as to remove toluene on the surface and weighed at once. The swollen sample is then dried in a current of air at room temperature over a 72-hour period to constant weight. The weights of initial and final sample are corrected for non-polymer content based on knowledge of components. From these figures:

$$\frac{\text{Corrected dry weight}}{\text{Corrected initial weight}} \times 100 = \text{percent gel}$$

Similarly percent swell is calculated by the formula:

$$\frac{\text{Swollen weight} - \text{corrected dry weight}}{\text{Corrected dry weight}} \times 100 = \text{percent swell}$$

| Examples | Blank | 1 | 2 | 3 | 4 | 5 |
|---|---|---|---|---|---|---|
| Composition (Parts): | | | | | | |
| Polypropylene (Linear atactic) RSV 2.5 [1] | 100 | 100 | 100 | 100 | 100 | 100 |
| Dicumyl peroxide | 5 | 5 | 5 | 5 | 5 | 10 |
| Diallyl phthalate | 0 | 5 | | | | |
| Triallyl ether of Pentaerythritol | 0 | | 5 | | | |
| Triallyl Cyanurate | 0 | | | 5 | | |
| Divinyl benzene | 0 | | | | | 10 |
| Percent Gel Formation | 0 | 100 | 71 | 51 | 74 | 68 |
| Percent Swell of Gel (toluene) | | 1,940 | 1,290 | 2,550 | 1,482 | 1,325 |

| Examples | Blank | 6 | 7 | 8 |
|---|---|---|---|---|
| Composition (Parts): | | | | |
| Ethylene-propylene copolymer [2] (Linear atactic) RSV 4.3 [1] | 100 | 100 | 100 | 100 |
| Dicumyl peroxide | 1 | 1 | 1 | 1 |
| Triallyl ether of Pentaerythritol | 0 | 1 | | |
| Triallyl cyanurate | 0 | | 1 | |
| Divinyl benzene | 0 | | | 1 |
| Percent Gel Formation | 30 | 49 | 70 | 60 |

[1] 0.1% in decahydronaphthalene at 135° C.
[2] 47% ethylene, 53% propylene.

| Examples | Blank | 9 | 10 | 11 | 12 |
|---|---|---|---|---|---|
| Composition (Parts): | | | | | |
| Polypropylene (Linear atactic) RSV 2.5 | 100 | 100 | 100 | 100 | 100 |
| Dicumyl peroxide | 10 | 5 | 5 | 5 | 10 |
| Dinitrosopiperazine | 0 | 5 | | | |
| N-p-dinitroso-N-Methyl Aniline | 0 | | 5 | | |
| p-Dinitrosobenzene | 0 | | | 5 | |
| Diphenyl guanidine | 0 | | | | 10 |
| Percent Gel Formation | 25 | 83 | 78 | 79 | 57 |
| Percent Swell | 7,900 | 1,130 | 1,500 | 1,260 | 3,760 |

Similarly, compositions made up without a free-radical generator but otherwise corresponding to compositions of Examples 1–12 and molded into 1/16 inch sheets when irradiated at 27° C. with gamma radiation ($1 \times 10^6$ roentgens per hour) for a 10-hour period showed at least as much cross-linking, as measured by percent gel formation and decrease of percent swell as the blank composition which contained no modifier when irradiated with $5 \times 10^6$ roentgens per hour for 10 hours.

Further tests with di(t-butyl) peroxide as the organic free-radical generator showed similar improvement in percent gel formation by use of the modifiers of this invention. The di(t-butyl) peroxide was compounded by use of toluene on the 2-roll mill as plasticizer so as to complete the milling at a lower temperature.

The process of this invention is applicable to linear atactic, crystalline, or non-linear amorphous polymers of ethylene or propylene or mixtures thereof, as well as copolymers of ethylene and propylene. The methods of preparing linear atactic polymers using various ionic catalysts such as Ziegler catalysts, and of preparing non-linear amorphous polymers using peroxide catalysts are well known in the art.

The compositions to be cured by cross-linking in accordance with this invention may be compounded with the usual antioxidants, plasticizers, rubber fillers and pigments, such as are used in polyethylene plastics. Compounding may be accomplished by milling alone or by first swelling with a solvent and eventual removal of solvent. When curing throughout such a filled or pigmented composition is desired, it is preferable to compound with the free-radical generator in the composition. Cross-linking of such a filled or pigmented composition may also be accomplished by radiation from a proper source. Thus, ultraviolet will normally effect cure only on the surface, while pentrating rays from a radioactive source will give cure throughout a considerably greater thickness of composition. Gamma radiation is used to obtain subsurface cross-linking.

The use of the modifiers of this invention in cross-linking of polyethylene, polypropylene, and copolymers of ethylene and propylene is applicable to atactic, amorphous, isotactic, or crystalline polymers. The polymers may also be cross-linked by the process of this invention in the oriented state, for example, by irradiation of oriented fibres, filaments, or films at temperatures below the softening point of the oriented material.

What I claim and desire to protect by Letters Patent is:

1. The process which comprises contacting a mixture of a polymeric material of the group consisting of atactic polypropylene and atactic ethylene-propylene copolymers and as the sole polymerizable monomeric material a modifier of the group consisting of polyallyl esters of cyanuric acid, diallyl esters of aromatic and aliphatic dibasic carboxylic acids, polyallyl ethers of polyhydric alcohols, symmetrical divinyl hydrocarbons in which the vinyl groups are separated from each other by at least 3 carbon atoms, biallyl and allyl methacrylate in an amount in the range of 0.5 to 20% under free-radical catalysis at a temperature in the range of $-10°$ to $400°$ F.

2. The process of claim 1 in which the polymeric material is atactic polypropylene and the modifier is divinylbenzene.

3. The process of claim 1 in which the polymeric material is atactic polypropylene and the modifier is triallyl cyanurate.

4. The process of claim 1 in which the polymeric material is atactic polypropylene and the modifier is triallyl ether of pentaerythritol.

5. The process of claim 1 in which the polymeric material is atactic ethylene-propylene copolymer and the modifier is divinylbenzene.

6. The process of claim 1 in which the polymeric material is atactic ethylene-propylene copolymer and the modifier is triallyl cyanurate.

7. The process of claim 1 in which the polymeric material is atactic ethylene-propylene copolymer and the modifier is triallyl ether of pentaerythritol.

(References on following page)

References Cited by the Examiner

UNITED STATES PATENTS

| | | | |
|---|---|---|---|
| 2,155,590 | 4/1939 | Garvey | 260—878 |
| 2,405,817 | 8/1946 | D'Alelio | 260—878 |
| 2,418,978 | 4/1947 | Mertens | 260—878 |
| 2,455,910 | 12/1948 | Alderson | 260—94.9 |
| 2,534,078 | 12/1950 | Strain | 260—94.9 |
| 2,609,353 | 9/1952 | Rubens et al. | 260—878 |
| 2,668,806 | 2/1954 | Haward et al. | 260—89 |
| 2,684,356 | 7/1954 | Arundale et al. | 260—80.7 |
| 2,728,742 | 12/1955 | Banes et al. | 260—878 |
| 2,826,570 | 3/1958 | Ivett | 260—94.9 |
| 2,882,263 | 4/1959 | Natta et al. | 260—93.8 |

FOREIGN PATENTS

| | | |
|---|---|---|
| 502,316 | 5/1954 | Canada. |
| 593,072 | 10/1947 | Great Britain. |

OTHER REFERENCES

Natta: Article in Scientific American, September 1957, pages 98–104.

MURRAY TILLMAN, *Primary Examiner.*

LEON J. BERCOVITZ, *Examiner.*

J. A. KOLASCH, E. B. WOODRUFF,
*Assistant Examiners.*